United States Patent
Livshiz et al.

(10) Patent No.: US 10,358,140 B2
(45) Date of Patent: Jul. 23, 2019

(54) LINEARIZED MODEL BASED POWERTRAIN MPC

(71) Applicant: GM GLOBAL TECHNOLOGY OPERATIONS LLC, Detroit, MI (US)

(72) Inventors: Michael Livshiz, Ann Arbor, MI (US); Bharath Pattipati, South Lyon, MI (US); Daniele Bernardini, Milan (IT); Alberto Bemporad, Lucca (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 114 days.

(21) Appl. No.: 15/719,963

(22) Filed: Sep. 29, 2017

(65) Prior Publication Data

US 2019/0100217 A1 Apr. 4, 2019

(51) Int. Cl.
*B60W 50/00* (2006.01)
*B60W 10/06* (2006.01)
*B60W 10/107* (2012.01)
*B60W 30/188* (2012.01)

(52) U.S. Cl.
CPC ........ *B60W 50/0097* (2013.01); *B60W 10/06* (2013.01); *B60W 10/107* (2013.01); *B60W 30/188* (2013.01); *B60W 2510/0619* (2013.01); *B60W 2510/0638* (2013.01); *B60W 2510/0657* (2013.01); *B60W 2510/1005* (2013.01); *B60W 2520/10* (2013.01); *B60W 2540/10* (2013.01); *B60W 2710/0666* (2013.01);
(Continued)

(58) Field of Classification Search
None
See application file for complete search history.

(56) References Cited

U.S. PATENT DOCUMENTS

| | | | |
|---|---|---|---|
| 4,161,929 | A | 7/1979 | Nohira et al. |
| 5,101,786 | A | 4/1992 | Kamio et al. |
| 5,706,780 | A | 1/1998 | Shirakawa |

(Continued)

FOREIGN PATENT DOCUMENTS

| | | |
|---|---|---|
| CN | 1594846 A | 3/2005 |
| WO | 2003065135 A1 | 8/2003 |

OTHER PUBLICATIONS

John C.G. Boot, "Quadratic Programming: Algorithms, Anomalies, Applications, vol. 2 of Studies in Mathematical and Managerial Economics," North Holland Publ. Comp., 1964; 213 pages.

N. Lawrence Ricker, "Use of Quadratic Programming for Constrained Internal Model Control," Ind. Eng. Chem. Process Des. Dev., 1985, pp. 925-936.

(Continued)

*Primary Examiner* — Timothy Hannon

(57) ABSTRACT

A propulsion system, control system, and method are provided for optimizing fuel economy, which use model predictive control systems to generate a plurality of sets of possible command values and determine a cost for each set of possible command values based on weighting values, a plurality of predicted values, and a plurality of requested values. The set of possible command values having the lowest cost is determined. A linearized axle torque requested value and a linearized axle torque measured value are each created by subtracting an estimated disturbance. The estimated disturbance is determined based on a model of a relationship between measured engine output torque and measured transmission ratio. The linearized axle torque measured value is used to compute the predicted values, which are used to determine the cost. The linearized axle torque requested value is also used to determine the cost.

19 Claims, 5 Drawing Sheets

(52) U.S. Cl.
CPC .. *B60W 2710/1005* (2013.01); *B60Y 2300/52* (2013.01); *B60Y 2400/72* (2013.01)

(56) References Cited

U.S. PATENT DOCUMENTS

| | | | |
|---|---|---|---|
| 5,727,528 A | 3/1998 | Hori et al. | |
| 5,775,293 A | 7/1998 | Kresse | |
| 5,921,219 A | 7/1999 | Frohlich et al. | |
| 6,014,955 A | 1/2000 | Hosotani et al. | |
| 6,155,230 A | 12/2000 | Iwano et al. | |
| 6,173,226 B1 | 1/2001 | Yoshida | |
| 6,532,935 B2 | 3/2003 | Ganser et al. | |
| 6,606,981 B2 | 8/2003 | Itovama | |
| 6,704,638 B2 | 3/2004 | Livshiz et al. | |
| 6,704,641 B2 | 3/2004 | Tashiro et al. | |
| 6,826,904 B2 | 12/2004 | Miura | |
| 6,840,215 B1 | 1/2005 | Livshiz et al. | |
| 6,953,024 B2 | 10/2005 | Linna et al. | |
| 6,993,901 B2 | 2/2006 | Shirakawa | |
| 7,016,779 B2 | 3/2006 | Bowyer | |
| 7,021,282 B1 | 4/2006 | Livshiz et al. | |
| 7,051,058 B2 | 5/2006 | Wagner et al. | |
| 7,222,012 B2 | 5/2007 | Simon, Jr. | |
| 7,235,034 B2 | 6/2007 | Berglund et al. | |
| 7,236,874 B2 | 6/2007 | Ichihara | |
| 7,274,986 B1 | 9/2007 | Petridis et al. | |
| 7,356,403 B2 | 4/2008 | Yoshioka et al. | |
| 7,395,147 B2 | 7/2008 | Livshiz et al. | |
| 7,400,967 B2 | 7/2008 | Ueno et al. | |
| 7,433,775 B2 | 10/2008 | Livshiz et al. | |
| 7,441,544 B2 | 10/2008 | Hagari | |
| 7,563,194 B2 | 7/2009 | Murray | |
| 7,614,384 B2 | 11/2009 | Livshiz et al. | |
| 7,698,048 B2 | 4/2010 | Jung | |
| 7,703,439 B2 | 4/2010 | Russell et al. | |
| 7,715,975 B2 | 5/2010 | Yamaoka et al. | |
| 7,775,195 B2 | 8/2010 | Schondorf et al. | |
| 7,777,439 B2 | 8/2010 | Falkenstein | |
| 7,813,869 B2 | 10/2010 | Grichnik et al. | |
| 7,885,756 B2 | 2/2011 | Livshiz et al. | |
| 7,941,260 B2 | 5/2011 | Lee et al. | |
| 7,949,459 B2 | 5/2011 | Yoshikawa et al. | |
| 7,967,720 B2 | 6/2011 | Martin et al. | |
| 7,967,729 B2 | 6/2011 | Martin et al. | |
| 7,975,668 B2 | 7/2011 | Ramappan et al. | |
| 7,980,221 B2 | 7/2011 | Baur et al. | |
| 8,010,272 B2 | 8/2011 | Kuwahara et al. | |
| 8,027,780 B2 | 9/2011 | Whitney et al. | |
| 8,041,487 B2 | 10/2011 | Worthing et al. | |
| 8,050,841 B2 | 11/2011 | Costin et al. | |
| 8,073,610 B2 | 12/2011 | Heap et al. | |
| 8,078,371 B2 | 12/2011 | Cawthorne | |
| 8,086,390 B2 | 12/2011 | Whitney et al. | |
| 8,103,425 B2 | 1/2012 | Choi et al. | |
| 8,103,428 B2 | 1/2012 | Russ et al. | |
| 8,116,954 B2 | 2/2012 | Livshiz et al. | |
| 8,121,763 B2 | 2/2012 | Hou | |
| 8,176,735 B2 | 5/2012 | Komatsu | |
| 8,181,627 B2 | 5/2012 | Sharpies et al. | |
| 8,209,104 B2 | 6/2012 | Soejima et al. | |
| 8,219,304 B2 | 7/2012 | Soma | |
| 8,241,177 B2 | 8/2012 | Doering et al. | |
| 8,307,814 B2 | 11/2012 | Leroy et al. | |
| 8,316,828 B2 | 11/2012 | Whitney et al. | |
| 8,447,492 B2 | 5/2013 | Watanabe et al. | |
| 8,468,821 B2 | 6/2013 | Liu et al. | |
| 8,483,935 B2 | 7/2013 | Whitney et al. | |
| 8,527,120 B2 | 9/2013 | Matthews et al. | |
| 8,560,204 B2 | 10/2013 | Simon et al. | |
| 8,566,008 B2 | 10/2013 | Soejima et al. | |
| 8,593,806 B2 | 11/2013 | Huang | |
| 8,594,904 B2 | 11/2013 | Livshiz et al. | |
| 8,635,001 B2 | 1/2014 | Doering et al. | |
| 8,739,766 B2 | 6/2014 | Jentz et al. | |
| 8,744,716 B2 | 6/2014 | Kar | |
| 8,862,248 B2 | 10/2014 | Yasui | |
| 8,954,257 B2 | 2/2015 | Livshiz et al. | |
| 8,977,457 B2 | 3/2015 | Robinette et al. | |
| 9,062,631 B2 | 6/2015 | Kinugawa et al. | |
| 9,067,593 B2 | 6/2015 | Dufford | |
| 9,075,406 B2 | 7/2015 | Nakada | |
| 9,145,841 B2 | 9/2015 | Miyazaki et al. | |
| 9,175,622 B2 | 11/2015 | Seiberlich et al. | |
| 9,175,628 B2 | 11/2015 | Livshiz et al. | |
| 9,222,426 B2 | 12/2015 | Rollinger et al. | |
| 9,243,524 B2 | 1/2016 | Whitney et al. | |
| 9,328,671 B2 | 5/2016 | Whitney et al. | |
| 9,334,815 B2 | 5/2016 | Cygan, Jr. et al. | |
| 9,347,381 B2 | 5/2016 | Long et al. | |
| 9,376,965 B2 | 6/2016 | Whitney et al. | |
| 9,378,594 B2 | 6/2016 | Wong et al. | |
| 9,382,865 B2 | 7/2016 | Genslak et al. | |
| 9,388,754 B2 | 7/2016 | Cygan, Jr. et al. | |
| 9,388,758 B2 | 7/2016 | Pochner et al. | |
| 9,399,959 B2 | 7/2016 | Whitney et al. | |
| 9,429,085 B2 | 8/2016 | Whitney et al. | |
| 9,435,274 B2 | 9/2016 | Wong et al. | |
| 9,447,632 B2 | 9/2016 | LeBlanc | |
| 9,528,453 B2 | 12/2016 | Whitney et al. | |
| 9,534,547 B2 | 1/2017 | Livshiz et al. | |
| 9,541,019 B2 | 1/2017 | Verdejo et al. | |
| 9,587,573 B2 | 3/2017 | Genslak et al. | |
| 9,599,049 B2 | 3/2017 | Zavala Jurado et al. | |
| 9,599,053 B2 | 3/2017 | Long et al. | |
| 9,605,615 B2 | 3/2017 | Long et al. | |
| 9,669,822 B2 | 6/2017 | Piper et al. | |
| 9,714,616 B2 | 7/2017 | Jin et al. | |
| 9,732,499 B2 | 8/2017 | Miyamoto et al. | |
| 9,732,688 B2 | 8/2017 | Cygan, Jr. et al. | |
| 9,765,703 B2 | 9/2017 | Whitney et al. | |
| 9,784,198 B2 | 10/2017 | Long et al. | |
| 9,789,876 B1 | 10/2017 | Livshiz et al. | |
| 9,797,318 B2 | 10/2017 | Storch et al. | |
| 9,863,345 B2 | 1/2018 | Wong et al. | |
| 9,920,697 B2 | 3/2018 | Pochner et al. | |
| 9,927,780 B2 | 3/2018 | Sun et al. | |
| 2004/0116220 A1 | 6/2004 | Yamamoto et al. | |
| 2005/0065691 A1 | 3/2005 | Cho | |
| 2007/0191181 A1 | 8/2007 | Burns | |
| 2009/0288899 A1 | 11/2009 | Belloso | |
| 2010/0211294 A1 | 8/2010 | Soejima | |
| 2012/0010860 A1 | 1/2012 | Kirkling et al. | |
| 2017/0306819 A1 | 10/2017 | Alfieri et al. | |
| 2017/0361842 A1 | 12/2017 | Livshiz et al. | |

OTHER PUBLICATIONS

C. E. Lemke, "A Method of Solution for Quadratic Programs," Rensselaer Polytechnic Institute, Troy, New York, Published Online: Jul. 1, 1962, pp. 442-453.

Kolmanovsky I., "Towards Engine and Powertrain Control Based on Model Predictive Control," Sep. 28, 2012, Powerpoint Presentation, 47 slides.

Gorinevsky, Lecture 14—Model Predictive Control Part 1: The Concept, Spring 2005, Powerpoint Presentation, 26 slides.

Bemporad, Alberto, "Model Predictive Control," Spring 2005, Powerpoint Presentation, 94 slides.

Boyd, S., "Model Predictive Control," Powerpoint Presentation, 25 slides.

U.S. Appl. No. 15/436,235, filed Feb. 17, 2017; Applicant: GM Global Technology Operations LLC; Title: Torque Security of MPC-Based Powertrain Control.

U.S. Appl. No. 15/465,647, filed Mar. 22, 2017; Applicant: GM Global Technology Operations LLC; Title: Coordination of Torque Interventions in MPC-Based Powertrain Control.

U.S. Appl. No. 15/697,748, filed Sep. 7, 2017; Applicant: GM Global Technology Operations LLC; Title: Fuel Economy Optimization Using Air-Per-Cylinder (APC) in MPC-Based Powertrain Control.

LINEARIZED MODEL BASED POWERTRAIN MPC

TECHNICAL FIELD

The disclosure relates to a control system and method for a propulsion system of a motor vehicle having an engine and a transmission, and more particularly to a control system and method that uses a multivariable controller.

INTRODUCTION

Propulsion system control in a motor vehicle generally involves reading driver and vehicle inputs, such as accelerator pedal position, vehicle sensor data, and torque requests, and communicating these inputs to an Engine Control Module (ECM) and a Transmission Control Module (TCM). The ECM may calculate a driver axle torque requested from the driver and vehicle inputs. The driver axle torque requested may then be communicated to the engine and to the ECM. The engine is controlled based on the desired driver axle torque to produce an actual axle torque. Meanwhile, and typically concurrently with calculating desired engine and axle torques, a desired speed or gear ratio is calculated from the desired axle torque and the vehicle speed. The desired transmission gear ratio, or CVT pulley ratio, is then communicated to the transmission. The transmission is controlled based on the desired gear ratio (or CVT pulley ratio) to produce an actual gear or pulley ratio. The actual axle torque and the actual gear or pulley ratio define the operating conditions of the motor vehicle.

While this system of propulsion system control is useful for its intended purpose, there is room in the art for improvements that provide dynamic control of the axle torque to balance drivability, performance, and fuel economy, especially in propulsion systems having a continuously variable transmission. Engine control systems have been developed to control engine output torque to achieve a desired torque. Traditional engine control systems, however, may not control the engine output torque as accurately as desired. Accordingly, model predictive control systems have been established to provide better optimization of axle torque and fuel economy. However, these systems cannot work well with nonlinear elements, such as where the axle torque output is a function of the engine torque multiplied by the transmission ratio.

SUMMARY

A method and system are provided to control a parameter, such as a vehicle acceleration, in a vehicle propulsion system while optimizing fuel economy, through the use of model predictive control. A disturbance is calculated based on a model of a relationship between engine output torque and transmission ratio. The disturbance is then subtracted from the axle torque requested and the axle torque measured when computing the desired engine output torque and transmission ratio to apply.

In one form, which may be combined with or separate from other forms disclosed herein, a method for controlling a propulsion system of a motor vehicle is provided. The method includes determining a plurality of requested values including a first requested value and determining a plurality of measured values including a first measured value, a second measured value, and a third measured value. The method further includes determining an estimated disturbance based on a model of a relationship between the first and second measured values. The method includes subtracting the estimated disturbance from the first requested value to establish a linearized requested value and subtracting the estimated disturbance from the third measured value to establish a linearized measured value. The method also includes determining a plurality of predicted values based in part on the plurality of measured values including the linearized measured value. The method includes generating a plurality of sets of possible command values and determining a cost for each set of possible command values of the plurality of sets of possible command values based on a first predetermined weighting value, a second predetermined weighting value, the plurality of predicted values, and the plurality of requested values including the linearized requested value. The method further includes determining which set of possible command values of the plurality of sets of possible command values has a lowest cost, and selecting the set of possible command values that has the lowest cost to define a set of selected command values.

In another form, which may be combined with or separate from the other forms disclosed herein, a control system for a propulsion system of a motor vehicle having a transmission and an engine is provided. The control system has a number of modules, including a reference generator. The reference generator is configured to generate a plurality of requested values including a first requested value. A linearization module is configured to generate an estimated disturbance based on a model of a relationship between first and second measured values. The control system is configured to subtract the estimated disturbance from the first requested value to establish a linearized requested value, and the control system is configured to subtract the disturbance from a third measured value to establish a linearized measured value. A prediction module is configured to generate a plurality of predicted values based in part on the first measured value, the second measured value, and the linearized measured value. A command generator module is configured to generate a plurality of sets of possible command values. A cost module is configured to determine a cost for each set of possible command values of the plurality of sets of possible command values based on a first predetermined weighting value, a second predetermined weighting value, the plurality of predicted values, and the plurality of requested values including the linearized requested value. The cost module is further configured to determine which set of possible command values of the plurality of sets of possible command values has a lowest cost. A selection module is configured to select the set of possible command values that has the lowest cost to define a set of selected command values.

In yet another form, which may be combined with or separate from the other forms described herein, a propulsion system for a motor vehicle is provided. The propulsion system includes an engine operable to power the motor vehicle, the engine having an engine output shaft configured to transfer engine output torque. The propulsion system further includes a continuously variable transmission having a variator assembly including a first pulley and a second pulley. The first and second pulleys are rotatably coupled by a rotatable member, at least one of the first and second pulleys including a movable sheave translatable along an axis to selectively change a transmission ratio between the engine output shaft and a transmission output shaft. A drive axle is configured to be driven via the transmission output shaft, the drive axle being configured to output axle torque to a set of wheels.

The propulsion system further includes a control system comprising a number of modules. A reference generator module is configured to generate a plurality of requested values including an axle torque requested value. A linearization module is configured to generate an estimated disturbance based on a model of a relationship between a measured engine output torque value and a measure transmission ratio value. The control system is configured to subtract the estimated disturbance from the axle torque requested value to establish a linearized axle torque requested value, and the control system is configured to subtract the estimated disturbance from a measured axle torque value to establish a linearized axle torque measured value. A command generator module is configured to generate a plurality of sets of possible command values. A prediction module is configured to generate a plurality of predicted actual axle torque values and a plurality of predicted actual fuel consumption rate values based on the plurality of sets of possible command values, the measured engine output torque value, the measured transmission ratio value, and the linearized axle torque measured value. The plurality of sets of possible command values include a plurality of possible commanded transmission ratio values and a plurality of possible commanded engine output torque values. A cost module is configured to determine a cost for each set of possible command values of the plurality of sets of possible command values based on a first predetermined weighting value, a second predetermined weighting value, the plurality of predicted values, and the plurality of requested values including the linearized axle torque requested value. The cost module is further configured to determine which set of possible command values of the plurality of sets of possible command values has a lowest cost. A selection module is configured to select the set of possible command values that has the lowest cost to define a set of selected command values. An actuation module is configured to control a vehicle parameter based on at least one selected command value of the set of selected command values.

Further additional features may be provided, including but not limited to the following: wherein the first measured value is an engine parameter; wherein the second measured value is a transmission parameter; wherein the first measured value is a measured engine output torque; wherein the second measured value is a measured transmission ratio; wherein the third measured value is a measured axle torque; and wherein the first requested value is an axle torque requested.

In some forms, the estimated disturbance is determined with the following equation:

$$D = \left\{ \frac{(\text{Rat\_m}_k * 100 - \text{Rat}_{off})(\text{Te\_m}_k - \text{Te\_off})FD}{100} \right\} - \text{Loss}(\text{Rat\_m}_k, \text{RPM\_m}_k, \text{Te\_m}_k)$$

where D is the estimated disturbance, FD is the final drive ratio, $\text{Rat\_m}_k$ the measured transmission ratio at a prediction step k, $\text{Rat\_off}$ is the nominal offset at which ratio model linearization was performed (e.g., $\text{Rat\_off}$ is set by ratio model linearization), $\text{Te\_m}_k$ is the measured engine output torque at the prediction step k, $\text{Te\_off}$ is the nominal offset at which engine torque model linearization was performed (e.g. $\text{Te\_off}$ is set by engine torque model linearization, loss is a mechanical loss factor, and $\text{RPM\_m}_k$ is a measured engine speed at the prediction step k.

Even further additional features may include: a step or module configured to control a vehicle parameter based on at least one selected command value of the set of selected command values; wherein the plurality of sets of possible command values includes a plurality of possible commanded engine output torque values and a plurality of possible commanded transmission ratio values and the set of selected command values includes a selected engine torque value and a selected transmission ratio value; generating a plurality of predicted actual axle torque values and a plurality of predicted actual fuel consumption rate values based on the plurality of sets of possible command values; determining the cost for each set of possible command values further based on a predicted actual axle torque value of the plurality of predicted axle torque values and a predicted actual fuel consumption rate value of the plurality of predicted actual fuel consumption rate values; and the plurality of requested values including a fuel consumption rate requested value, the linearized requested value, an engine output torque requested value, and a transmission ratio requested value.

The control system may further includes a steady state optimizer module configured to: determine an accelerator pedal position; determine the estimated engine speed; determine the vehicle speed; determine the air-fuel ratio; generate the axle torque requested value based on the accelerator pedal position and the vehicle speed; generate the transmission ratio requested value based on the axle torque requested value and the vehicle speed; generate the engine output torque requested value based on the axle torque requested value, the transmission ratio requested value, and a final drive ratio; and generate the fuel rate requested value.

In addition, the method and/or control system may be configured to determine the plurality of predicted actual axle torque values and the plurality of predicted actual fuel consumption rate values with the following set of equations:

$$x_{k+1} = \left\{ A * x_k + B * \begin{bmatrix} \text{Te\_c} \\ \text{Rat\_c}_k \end{bmatrix} + v \right\} + K_{KF} * \left( \begin{bmatrix} \text{Te\_m}_k \\ \text{FR\_m}_k \\ \text{Rat\_m}_k \\ \text{Ta\_m}_k - D \end{bmatrix} - \begin{bmatrix} \text{Te\_a}_k \\ \text{FR\_a}_k \\ \text{Rat\_a}_k \\ \text{Ta\_a}_k \end{bmatrix} \right)$$

$$\begin{bmatrix} \text{Ta\_a}_{k+1} \\ \text{FR\_a}_{k+1} \end{bmatrix} = C * x_{k+1} + w$$

where
$x_{k+1}$=state variable at a prediction step k+1;
$x_k$=state variable at a prediction step k;
A=a state matrix;
B=an input matrix;
Te_c=engine output torque commanded at the prediction step k;
$\text{Rat\_c}_k$=transmission ratio commanded at the prediction step k;
$K_{KF}$=Kalman filter gain;
$\text{Te\_a}_k$=predicted actual engine output torque at the prediction step k;
$\text{FR\_a}_k$=predicted actual fuel consumption rate at the prediction step k;
$\text{Rat\_a}_k$=predicted actual transmission ratio at the prediction step k;
$\text{Ta\_a}_k$=predicted actual axle torque at the prediction step k;
$\text{Te\_m}_k$=measured engine output torque at the prediction step k;

FR_m$_k$=measured fuel consumption rate at the prediction step k;
Rat_m$_k$=measured transmission ratio at the prediction step k;
Ta_m$_k$=measured axle torque at the prediction step k;
D=estimated disturbance;
Ta_a$_{k+1}$=predicted actual axle torque at the prediction step k+1;
FR_a$_{k+1}$=predicted actual fuel consumption rate at the prediction step k+1;
C=an output matrix;
v=process noise; and
w=measurement noise.

Further, the method and control system may be configured to determine the plurality of costs with the following cost equation:

$$\text{Cost} = \Sigma(y(i\,|\,k) - y_{ref})^T Q_Y(y(i\,|\,k) - y_{ref}) +$$
$$(u(i\,|\,k) - u_{ref})^T Q_U(u(i\,|\,k) - u_{ref}) + \Delta u(i\,|\,k)^T Q_{\Delta u}\Delta u(i\,|\,k)$$

$$y = \begin{bmatrix} \text{Te\_a} \\ \text{FR\_a} \\ \text{Rat\_a} \\ \text{Ta\_a} \end{bmatrix}$$

$$y_{ref} = \begin{bmatrix} \text{Te\_r} \\ \text{FR\_r} \\ \text{Rat\_r} \\ \text{Ta\_r} - D \end{bmatrix}$$

$$u = \begin{bmatrix} \text{Te\_c} \\ \text{Rat\_c} \end{bmatrix}$$

$$u_{ref} = \begin{bmatrix} \text{Te\_r} \\ \text{Rat\_r} \end{bmatrix}$$

where
Te_a=predicted actual engine output torque;
FR_a=predicted actual fuel consumption rate;
Rat_a=predicted actual transmission ratio;
Ta_a=predicted actual axle torque;
Te_r=engine output torque requested;
FR_r=fuel consumption rate requested;
Rat_r=transmission ratio requested;
Ta_r=axle torque requested;
D=estimated disturbance;
Te_c=commanded engine output torque;
Rat_c=commanded transmission ratio;
$Q_y$=the first predetermined weighting value;
$Q_u$=the second predetermined weighting value;
$Q_{\Delta u}$=a third predetermined weighting value;
i=index value;
k=prediction step; and
T=transposed vector.

Additional features, aspects and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
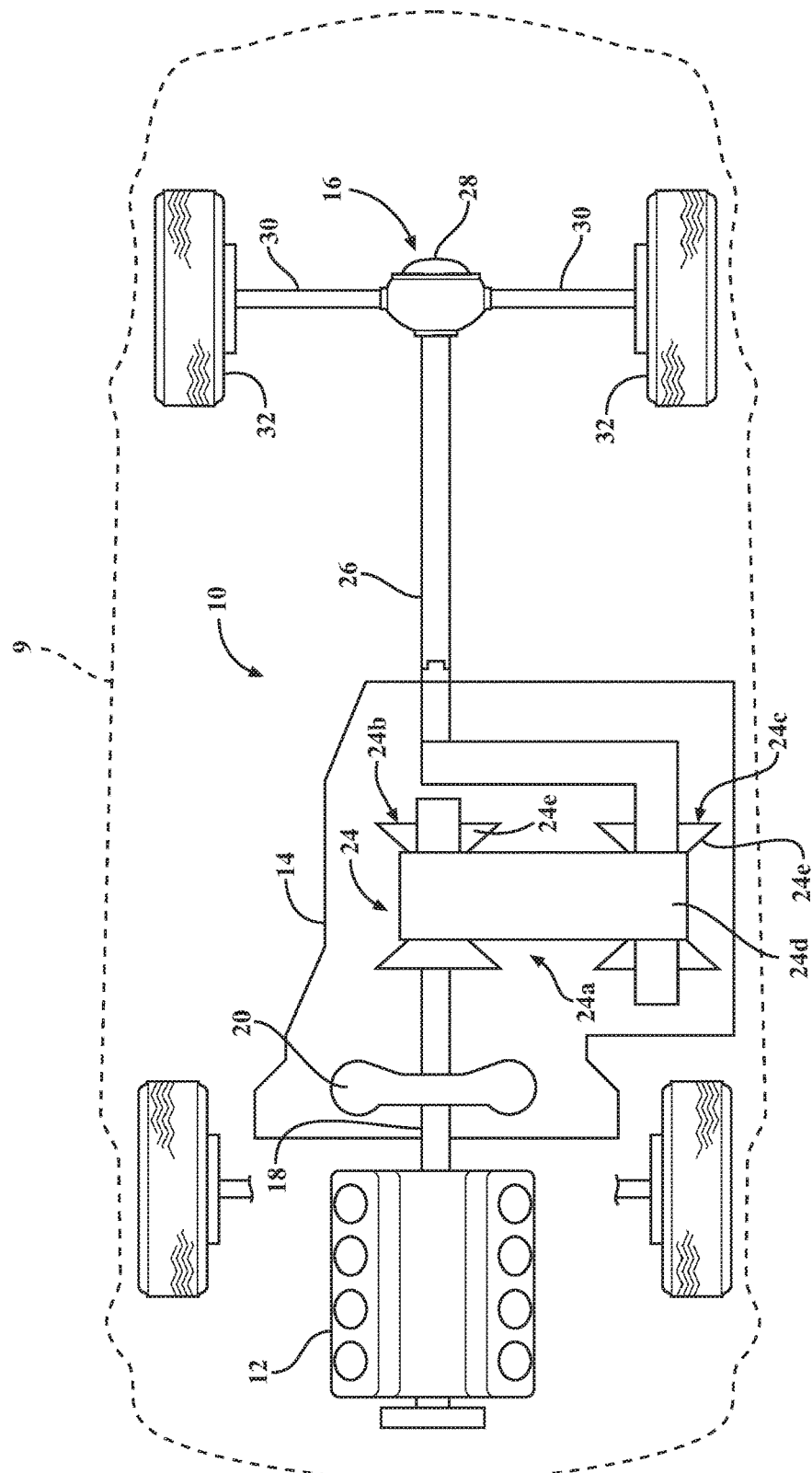
FIG. 1 is a schematic diagram of a motor vehicle having an exemplary propulsion system, in accordance with the principles of the present disclosure.

With reference to FIG. 1, an exemplary motor vehicle is shown and generally indicated by reference number 9. The motor vehicle 9 is illustrated as a passenger car, but it should be appreciated that the motor vehicle 9 may be any type of vehicle, such as a truck, van, sport-utility vehicle, etc. The motor vehicle 9 includes an exemplary propulsion system 10. It should be appreciated at the outset that while a rear-wheel drive propulsion system 10 has been illustrated, the motor vehicle 9 may have a front-wheel drive propulsion system without departing from the scope of the present disclosure.

The propulsion system 10 generally includes an engine 12 interconnected with a transmission 14 and a final drive unit 16. The engine 12 may be a conventional internal combustion engine or an electric engine, hybrid engine, or any other type of prime mover, without departing from the spirit and scope of the present disclosure. The engine 12 supplies a driving engine output torque to the transmission 14 via a crankshaft or engine output shaft 18. The driving engine output torque may be transmitted through a flexplate and/or starting device 20 to the transmission 14. The starting device 20 may be a hydrodynamic device, such as a fluid coupling or torque converter, a wet dual clutch, or an electric motor, by way of example. Torque is then transmitted from the starting device 20 to at least one transmission input shaft 22.

The transmission 14 may be a stepped transmission having planetary gears, a countershaft transmission, a continuously variable transmission, or an infinitely variable transmission. Torque from the transmission input shaft 22 is communicated through a ratio control unit 24 to a transmission output shaft 26. Generally, the ratio control unit 24 provides a plurality of forward or reverse speed or gear ratios, or an infinite number of forward or reverse speed or gear ratios, between the transmission input shaft 22 and the transmission output shaft 26.

Where the transmission 14 is a continuously variable transmission, the ratio control unit 24 may include a variator assembly 24a having first and second pulleys 24b, 24c that are rotatably coupled by an endless rotatable member 24d wrapped around the variable diameter pulleys 24b, 24c. At least one of the first and second pulleys 24b, 24c includes a movable sheave 24e translatable along an axis to selectively change a gear ratio between the engine output shaft 18 and the transmission output shaft 26.

The transmission output shaft 26 communicates output torque to the final drive unit 16. The final drive unit 16 generally includes a differential 28 that transfers axle torque through drive axles 30 to drive wheels 32.

Figure 2:
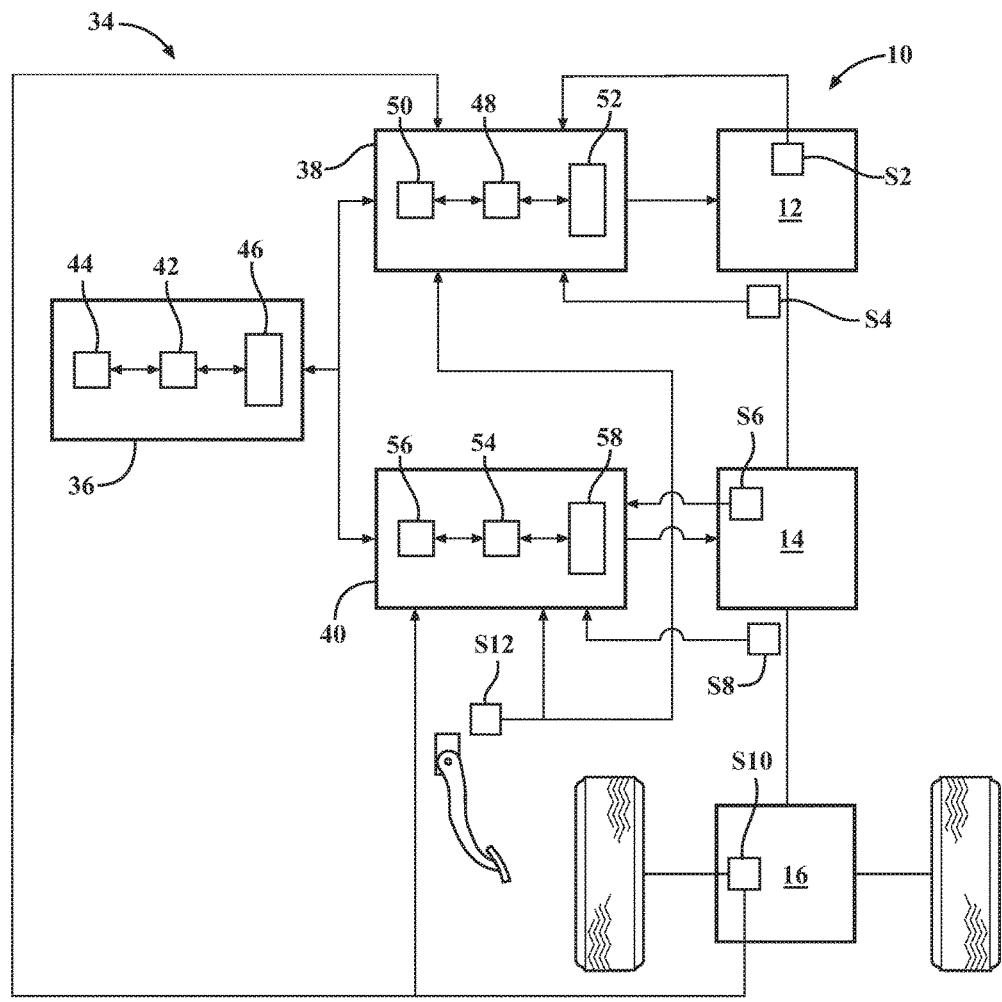
FIG. 2 is a schematic diagram showing a propulsion control system for use with the propulsion system shown in FIG. 1, according to the principles of the present disclosure.

Turning now to FIG. 2, a vehicle propulsion control system for use with the exemplary propulsion system 10 is generally indicated by reference number 34. The vehicle propulsion control system 34 includes a supervisory control module 36 in electronic communication with an engine control module 38 and a transmission control module 40. The modules 36, 38, and 40 may communicate through a vehicle network or cable area network (CAN) bus. The vehicle propulsion control system 34 may include or communicate with various other control modules, such as a body control module or infotainment control module. Alternatively, the supervisory control module 36 may be subsumed within the engine control module 38 or transmission control module 40.

The supervisory control module 36 is a non-generalized, electronic control device having a preprogrammed digital computer or processor 42, memory or non-transitory computer readable medium 44 used to store data such as control logic, instructions, image data, lookup tables, etc., and a plurality of input/output peripherals or ports 46. The processor 42 is configured to execute the control logic or instructions.

The engine control module 38 is a non-generalized, electronic control device having a preprogrammed digital computer or processor 48, memory or non-transitory computer readable medium 50 used to store data such as control logic, instructions, image data, lookup tables, etc., and a plurality of input/output peripherals or ports 52. The processor 48 is configured to execute the control logic or instructions. The engine control module 38 communicates with, and controls, the engine 12.

The transmission control module 40 is a non-generalized, electronic control device having a preprogrammed digital computer or processor 54, memory or non-transitory computer readable medium 56 used to store data such as control logic, instructions, image data, lookup tables, etc., and a plurality of input/output peripherals or ports 58. The processor 54 is configured to execute the control logic or instructions. The transmission control module 40 communicates with, and controls, the transmission 14.

The vehicle propulsion control system 34 communicates with a plurality of sensors connected to the propulsion system 10 including an air flow sensor S2 in the engine 12, an engine speed sensor S4, a transmission input shaft speed sensor S6, a transmission output shaft speed sensor S8, a vehicle speed sensor S10, and a pedal position sensor S12. The air flow sensor S2 and the engine speed sensor S4 communicate with the engine control module 38. The transmission input shaft speed sensor S6 and the transmission output shaft speed sensor S8 communicate with the transmission control module 40. The vehicle speed sensor S10 and the pedal position sensor S12 communicate with both the engine control module 38 and the transmission control module 40.

Figure 3:
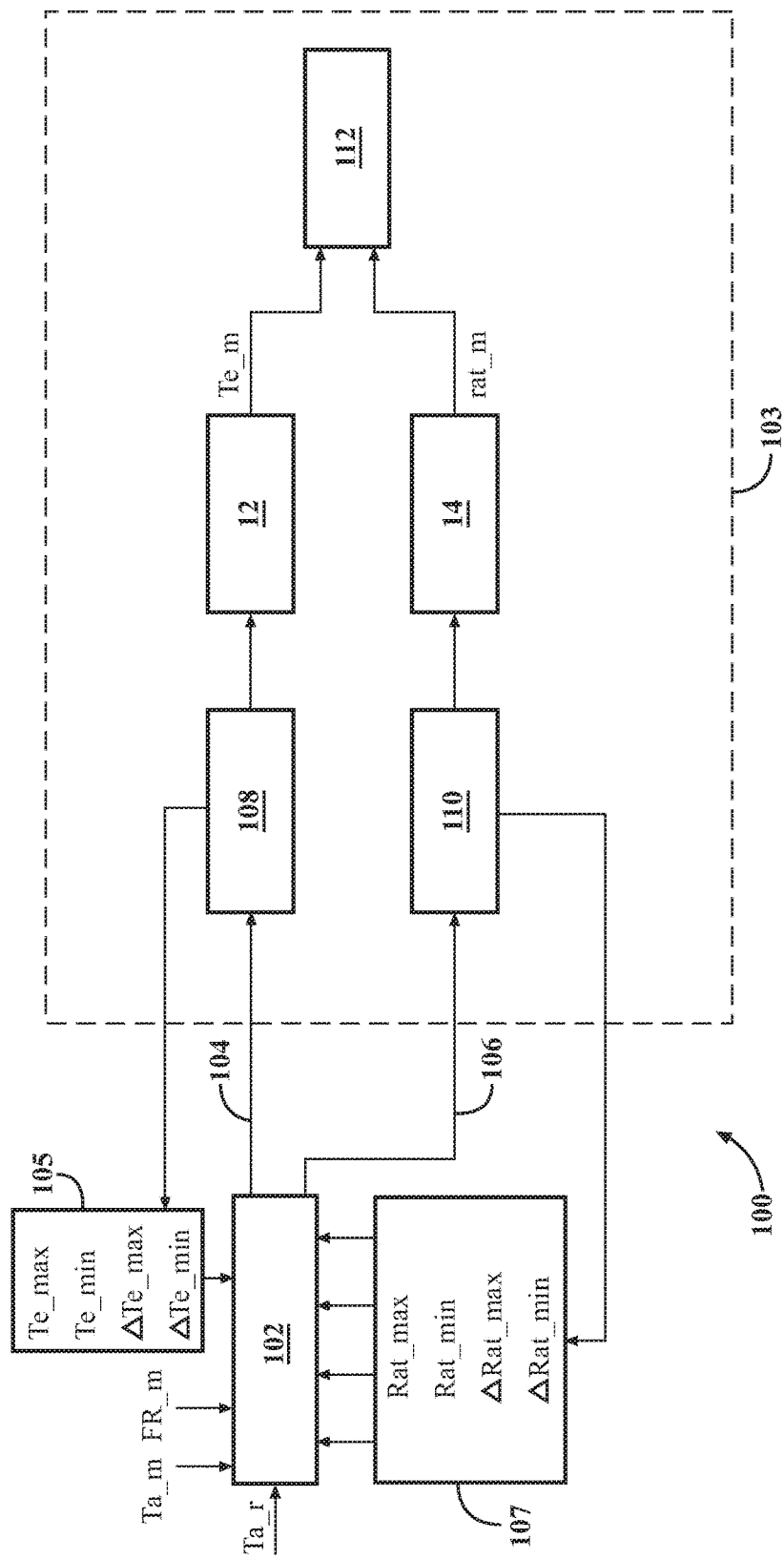
FIG. 3 is a schematic diagram of a control system for use with the propulsion control system shown in FIG. 2, in accordance with the principles of the present disclosure.

With reference to FIG. 3, and continued reference to FIGS. 1 and 2, a control diagram for the vehicle propulsion control system 34 is illustrated. The control diagram illustrates a control system or method 100 for controlling a parameter, such as vehicle acceleration, while optimizing fuel economy, which utilizes a multivariable controller. The control system 100 includes a multivariable controller 102 and a plant 103 that is controlled by the multivariable controller 102. The multivariable controller 102 may iteratively control an engine output torque Te 104 and a transmission ratio Rat 106 to optimize a fuel consumption rate FR and to achieve a desired axle torque Ta. The axle torque Ta is the amount of torque at the vehicle axle 30. Inputs to the multivariable controller 102 include a measured actual axle torque Ta_m, a measured fuel consumption rate FR_m, and an axle torque requested Ta_r, which may be based on driver and vehicle inputs and/or an axle torque intervention, which will be discussed in further detail below.

The control system 100 may include an engine torque controller 108, a transmission ratio controller 110 (which may be a variator controller for CVTs), and a vehicle dynamics module 112. In some examples, the multivariable controller 102 is stored and executed by the supervisory control module 36, the engine torque controller 108 is stored and executed by the engine control module 38, and the transmission ratio controller 110 is stored and executed by the transmission control module 40. The vehicle dynamics module 112 may be stored and executed by the engine control module 38, the transmission control module 40, or any other control module or a combination of control modules.

The multivariable controller 102 may optionally receive system limitations 105 from the engine controller 108 including a maximum engine output torque $Te_{max}$, a minimum engine output torque $Te_{min}$, a maximum rate of change of engine output torque $\Delta Te_{max}$, and a minimum rate of change of engine output torque $\Delta Te_{min}$. The multivariable controller 102 may also optionally receive system limitations 107 from the transmission ratio controller 110 including a maximum transmission ratio $Rat_{max}$, a minimum transmission ratio $Rat_{min}$, a maximum rate of change of transmission ratio $\Delta R_{max}$, and a minimum rate of change of transmission ratio $\Delta R_{min}$.

Figure 4:
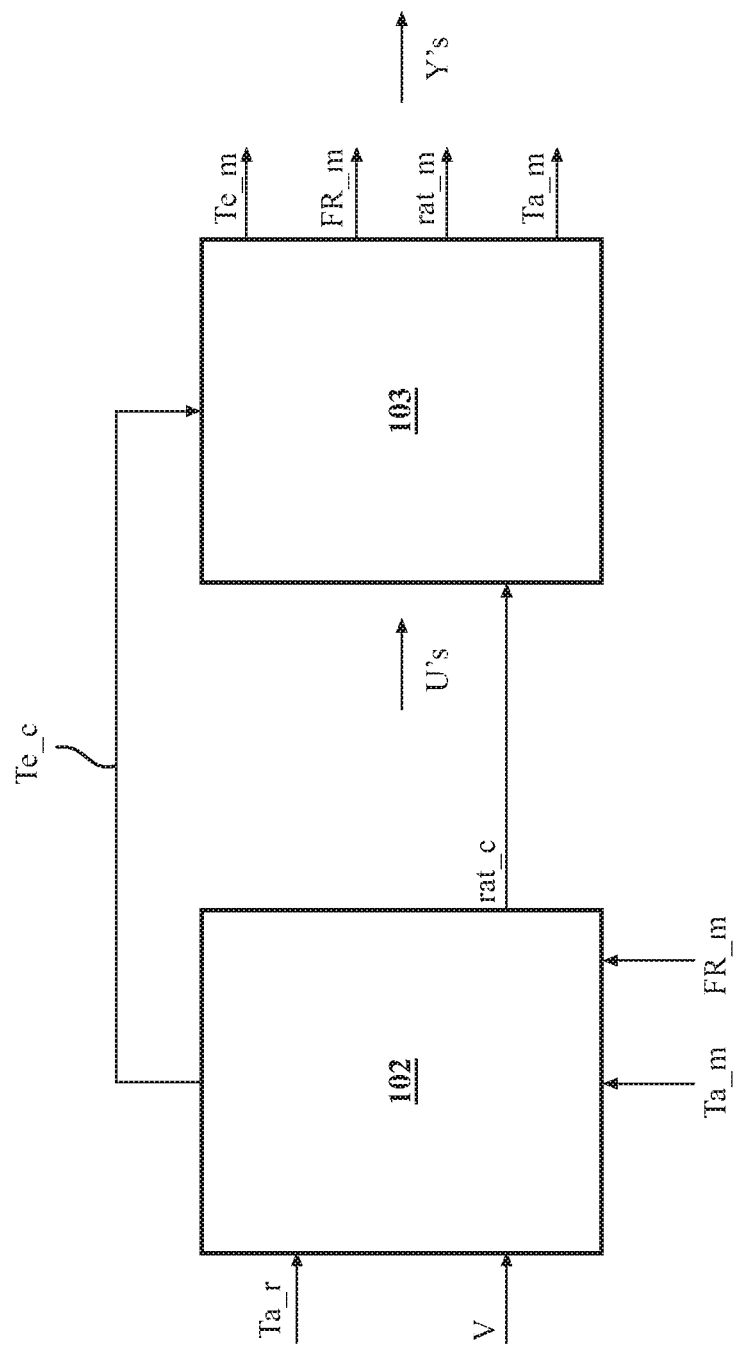
FIG. 4 is a schematic diagram illustrating additional details of the control system shown in FIG. 3, according to the principles of the present disclosure.

Referring now to FIG. 4, another representation of the control system 100 is illustrated, showing inputs and outputs to the multivariable controller 102 and the plant 103 controlled by the multivariable controller 102. For example, inputs to the multivariable controller 102 may include an axle torque requested Ta_r and vehicle speed V. Feedback inputs of axle torque measured Ta_m and fuel consumption rate measured FR_m may also be input to the multivariable controller 102. Outputs of the multivariable controller 102 may include an engine output torque commanded Te_c and a transmission ratio commanded Rat_c. These controlled outputs, or "u" variables (Te_c and Rat_c), of the multivariable controller 102 may be inputs to the plant 103, which includes the engine 12 and transmission 14.

The engine output torque commanded Te_c is used to control the engine 12 to result in an actual engine output torque, which is the measured engine output torque Te_m. The transmission ratio commanded Rat_c is used to control the transmission 14 to provide an actual measured gear ratio or pulley ratio Rat_m between the transmission input shaft 22 and the transmission output shaft 26. Thus, the plant 103 outputs the "y" variables, the values that may be tracked, which may include actual measured engine torque Te_m, actual measured fuel consumption rate FR_m, actual measured transmission ratio (or pulley ratio) Rat_m, and actual measured axle torque Ta_m.

Figure 5:
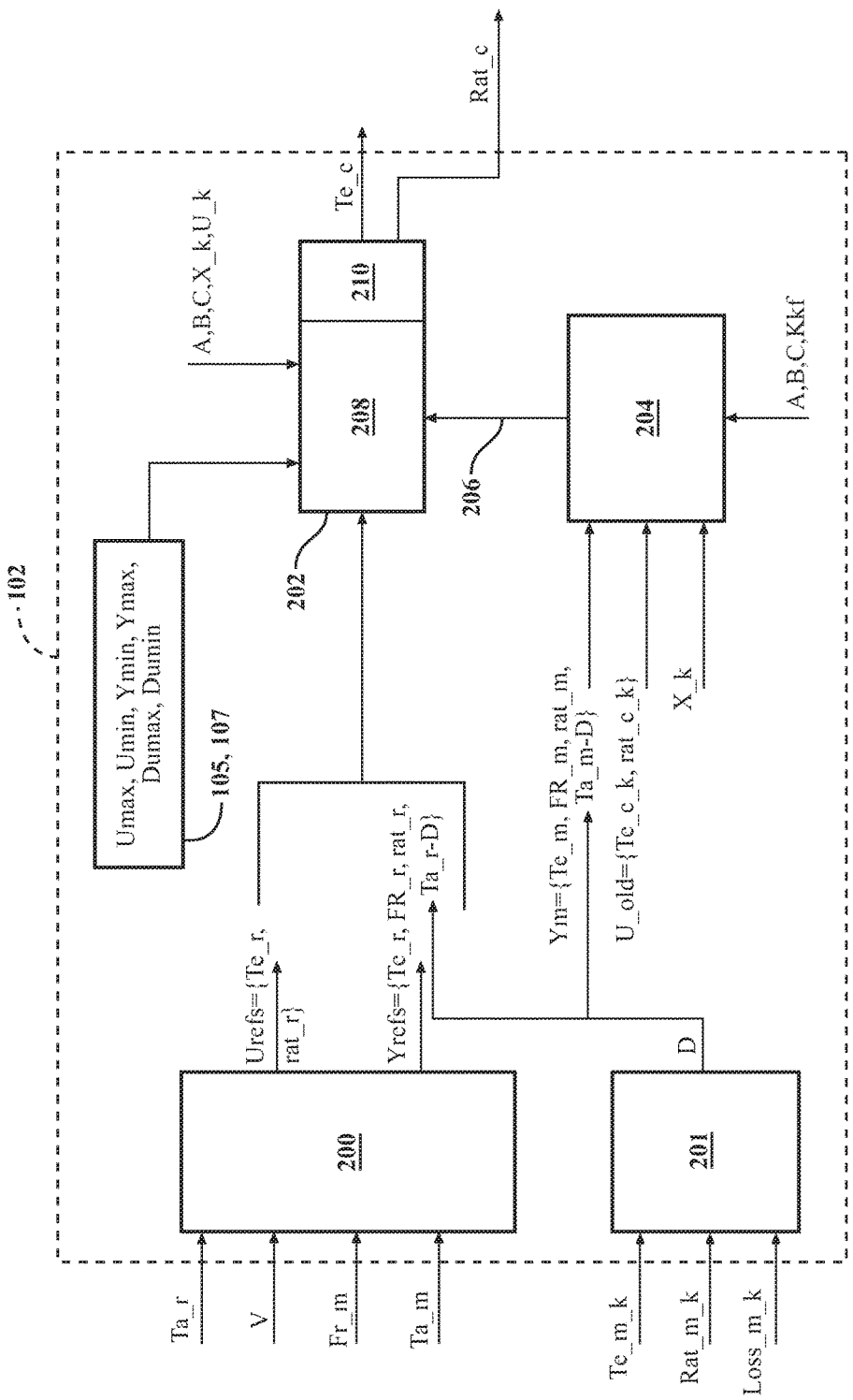
FIG. 5 is a schematic diagram illustrating additional details of a multivariable controller of the control system shown in FIGS. 3-4, in accordance with the principles of the present disclosure.

Referring now to FIG. 5, additional details of the multivariable controller 102 are illustrated. The multivariable controller 102 includes a steady state optimizer module 200, which is a reference generator. The steady state optimizer module 200 determines reference values (desired or requested values) for the "u" variables (controlled variables) and the "y" variables (the optimized output variables that may be tracked). For example, the steady state optimizer module 200 is configured to determine an engine output torque requested value Te_r, a transmission ratio requested value Rat_r, a fuel consumption rate requested value FR_r, and an axle torque requested value Ta_r. The $u_{refs}$ include the engine output torque requested value Te_r and the transmission ratio requested value Rat_r, while the $y_{refs}$ may include all four of the engine output torque requested value Te_r, the transmission ratio requested value Rat_r, the fuel consumption rate requested value FR_r, and the axle torque requested value Ta_r. The $u_{refs}$ and the $y_{refs}$ are values that are desirable during a steady state. The MPC module 202, described below, optimizes the trajectory, particularly of the fuel consumption rate, during the transient from one steady state to another.

The axle torque requested value Ta_r may be determined (e.g., in the sub-module 200C) based on the accelerator pedal position PP and the vehicle speed V. For example, $$Ta\_r = f(PP, V). \quad (1)$$

In some examples, the axle torque requested value Ta_r may be determined from a lookup table or 2D map from a vehicle speed V sensed by vehicle speed sensor S10 and an accelerator pedal position PP sensed by the pedal position sensor S12.

The transmission ratio requested value Rat_r may be determined (e.g., in the sub-module 200B) based on the axle torque requested value Ta_r and the vehicle speed V. For example, $$Rat\_r = f(Ta\_r, V). \quad (2)$$

The engine output torque requested value Te_r may be determined (e.g., in the sub-module 200A) based on the axle torque requested value Ta_r, the transmission ratio requested value Rat_r, and the final drive ratio FD (which is constant for a given vehicle). For example $$Te\_r = \frac{Ta\_r + Loss}{Rat\_r * FD}. \quad (3)$$

The "loss" factor may encompass mechanical losses, such as friction and pulley clamping losses, by way of example.

Minimization of fuel is achieved by minimizing engine power for requested axle power. The fuel consumption rate requested FR_r may thus be determined in any suitable way that strives to accomplish this goal. For example, the fuel consumption rate requested FR_r may be determined based on the axle torque requested Ta_r, the vehicle speed V, the engine speed RPM, and the air-fuel ratio AF. For example, $$FR\_r = f(Ta\_r, V, RPM, AF). \quad (4)$$

The engine speed RPM may be determined from the engine speed sensor S4. The air-fuel ratio AF is the ratio of the mass of air to the mass of fuel, which may be reported by a fuel control module, by way of example. In some forms, the fuel consumption rate requested value FR_r may be based on an air-per-cylinder (APC) requested value.

Once the requested values, or reference values, are determined, the steady state optimizer module 200 outputs them (the u_refs and the y_refs) to the MPC module 202. The MPC module 202 uses model predictive control and may also be referred to as a quadratic programming solver, such as a Dantzig QP solver. However, prior to using the axle torque requested value, Ta_r, in the MPC module 202, this value is linearized into a linearized torque requested value, Ta_r–D, as described further below.

A prediction module 204 is configured to predict at least an actual axle torque and an actual fuel consumption rate for use in the MPC module 202. The prediction module 204 may also be referred to as a state observer, which uses a Kalman filter. The predicted actual values 206 are output from the prediction module 204 to the MPC module 202.

The prediction module 204 is configured to generate a plurality of predicted actual axle torque values and fuel consumption rate values. For example, the prediction module generates at least a first predicted actual axle torque value and a first predicted actual fuel consumption rate value based on a first set of possible command values (which may be generated, for example, by a command generator module formed as part of the prediction module 204 or the MPC module 202), where the first set of possible command values includes a first commanded engine output torque value Te_c and a first commanded transmission ratio value Rat_c. The prediction module 204 is further configured to generate at least a second predicted actual axle torque value and a second predicted actual fuel consumption rate value based on a second set of possible command values, where the second set of possible command values includes a second commanded engine output torque value Te_c and a second commanded transmission ratio value Rat_c. In practice, a much larger number of predicted values may be generated based on additional sets of possible command values (third, fourth, fifth, etc. sets of possible Te_c and Rat_c values). The predicted actual values 206 are output to the MPC module 202.

The prediction module 204 may provide a number of predicted actual values 206 to the MPC module 202 by the cost module 208. The prediction module 204 may use equations such as the following to determine the predicted actual values 206:

$$y_k = C * x_k + w \quad (5)$$

$$y_{k+1} = C * x_{k+1} + w \quad (6)$$

$$x_{k+1} = A * x_k + B * u_k + v + K_{KF} * (y_k - y_{mk}) \quad (7)$$

$$y_k = \begin{bmatrix} Te\_a_k \\ FR\_a_k \\ Rat\_a_k \\ Ta\_a_k \end{bmatrix}$$

$$y_{k+1} = \begin{bmatrix} Te\_a_{k+1} \\ FR\_a_{k+1} \\ Rat\_a_{k+1} \\ Ta\_a_{k+1} \end{bmatrix}$$

$$u_k = \begin{bmatrix} Te\_c_k \\ Rat\_c_k \end{bmatrix}$$

$$y_{mk} = \begin{bmatrix} Te\_m_k \\ FR\_m_k \\ Rat\_m_k \\ Ta\_m_k - D \end{bmatrix}$$

where A=a state (or transmission) matrix; B=an input matrix; C=an output (or measured) matrix; $Te\_a_k$=predicted actual engine output torque at the prediction step k; $FR\_a_k$=predicted actual fuel consumption rate at the prediction step k; $Rat\_a_k$=predicted actual transmission ratio at the prediction step k; $Ta\_a_k$=predicted actual axle torque at the prediction step k; $x_k$=state variable at a prediction step k; $Te\_a_{k+1}$=predicted actual engine output torque at the prediction step k+1; $FR\_a_{k+1}$=predicted actual fuel consumption rate at the prediction step k+1; $Rat\_a_{k+1}$=predicted actual transmission ratio at the prediction step k+1; $Ta\_a_{k+}$ $_1$=predicted actual axle torque at the prediction step k+1; $x_{k+1}$=state variable at a prediction step k+1; Te_$c_k$=engine output torque commanded at the prediction step k; Rat_$c_k$=transmission ratio commanded at the prediction step k; $K_{KF}$=a Kalman filter gain (obtained by solving an algebraic Ricatti equation); Te_$m_k$=measured engine output torque at the prediction step k; FR_$m_k$=measured fuel consumption rate at the prediction step k; Rat_$m_k$=measured transmission ratio at the prediction step k; Ta_$m_k$=measured axle torque at the prediction step k; D is an estimated disturbance (which is described in further detail below); v=process noise; and w=measurement noise. The prediction step k is a prediction step at the current time (e.g., now), and the prediction step k+1 is a prediction one step ahead.

Measured engine output torque Te_m may be sensed from the engine torque sensor S4. The measured transmission ratio, or pulley ratio, Rat_m may be determined from the speed of the transmission input shaft 22 sensed by the transmission input shaft speed sensor S6 and the speed of the transmission output shaft 26 sensed by the transmission output shaft speed sensor S8, and may be provided by the TCM 40.

Ta_$a_{k+1}$ and FR_$a_{k+1}$ may be defined as or equal to the first predicted actual axle torque value and the first predicted actual fuel consumption rate value, respectively, when generated based on the first set of possible command values for Te_$c_k$ and Rat_$c_k$, and Ta_$a_{k+1}$ and FR_$a_{k+1}$ may be defined as or equal to the second predicted actual axle torque value and the second predicted actual fuel consumption rate value, respectively, when generated based on the second set of possible command values for Te_$c_k$ and Rat_$c_k$, and so on.

A linearization module 201 is provided in order to linearize the axle torque requested that is used by the MPC module 202. Axle torque is typically based on a nonlinear relationship between engine output torque and transmission ratio, such as shown by the following relationship:

$$Ta = Te * Rat * FD - Loss(RPM, Rat, Te) \quad (8)$$

where Ta is axle torque, Te is engine output torque, Rat is transmission ratio, FD is the final drive ratio, and loss represents mechanical CVT losses that are a function of engine speed (RPM), transmission ratio, and engine output torque. The losses here may be the same or similar to those used in equation (3).

Such nonlinear relationship between the engine output torque and the transmission ratio with respect to the axle torque does not work well in the MPC module 202, because the predicted values determined with equations (5), (6), or (7) assume a linear relationship between the matrix variables.

Thus, to linearize the axle torque, an estimated disturbance is introduced based on a model of the measured engine output torque with respect to the measured transmission ratio. The linearization module 201 is configured to calculate the estimated disturbance so that it may be further applied within the controller 200.

Therefore, in one example, the linearization module 201 is configured to calculate the estimated disturbance with the following equation:

$$D = \left\{ \frac{(\text{Rat\_m}_k * 100 - \text{Rat}_{off})(\text{Te\_m}_k - \text{Te\_off})FD}{100} \right\} - \text{Loss}(\text{Rat\_m}_k, \text{RPM\_m}_k, \text{Te\_m}_k) \quad (9)$$

where D is the estimated disturbance, FD is the final drive ratio, Rat_$m_k$ the measured transmission ratio at a prediction step k, Rat_off is the nominal offset at which ratio model linearization was performed (e.g., Rat_off is set by ratio model linearization), Te_$m_k$ is the measured engine output torque at the prediction step k, Te_off is the nominal offset at which engine torque model linearization was performed (e.g. Te_off is set by engine torque model linearization, loss is a mechanical loss factor, and RPM_$m_k$ is a measured engine speed at the prediction step k.

The Loss input (based on the transmission ratio, the engine torque output, and the engine speed) may be stored in a lookup table for use by the linearization module 201. The final drive ratio FD is a constant for a given vehicle typically computed by multiplying axle ratio by final chain ratio. The offsets are determined in a typical calibration system identification procedure, where a model of axle torque based on certain engine output torques and transmission ratios is determined and offsets are chosen so that measured values best adhere to the model.

The estimated disturbance D may then be output from the linearization module 201 to be subtracted from both the axle torque requested Ta_r that is input to the MPC module 202 and from the axle torque measured Ta_m that is input to the prediction module 204 and used in equation (7) to determine the predicted values. Accordingly, the axle torque requested value that is used by the MPC module 202 is a linearized axle torque requested value equal to Ta_r−D. Similarly, the axle torque measured value that is used by the prediction module 204 is a linearized axle torque measured value equal to: Ta_m−D.

The MPC module 202 contains a cost module 208 that is configured to determine a first cost for the first set of possible command values Te_c, Rat_c based on at least first and second predetermined weighting values, the first predicted actual axle torque value, the first predicted actual fuel consumption rate value, the linearized axle torque requested value Ta_r−D, the engine output torque requested value Te_r, the transmission ratio requested value Rat_r, and the fuel consumption rate requested value FR_r. Similarly, the cost module 208 is configured to determine a second cost for the second set of possible command values Te_c, Rat_c based on at least the first and second predetermined weighting values, the second predicted actual axle torque, the second predicted actual fuel consumption rate value, the linearized axle torque requested value Ta_r−D, the engine output torque requested value Te_r, the transmission ratio requested value Rat_r, and the fuel consumption rate requested value FR_r. Likewise, many more additional costs may be determined based on additional sets of predicted values and command values, in order to optimize for the lowest cost.

The MPC module 202 may also include a selection module 210 configured to select one of the plurality of sets of possible command values Te_c, Rat_c based on the lowest of the determined costs and set a selected engine output torque value Te_c and a selected transmission ratio value Rat_c equal to, or based on, the possible command values Te_c, Rat_c of the selected one of the plurality of possible sets.

The selected command values Te_c and Rat_c are output from the MPC module 202 to the plant 103 (see FIGS. 3 and 4). The multivariable controller 102 or the plant 103 may contain an actuation module configured to control a vehicle parameter based on at least one of the desired (selected) command values Te_c, Rat_c. For example, acceleration of the vehicle 9 may be controlled to optimize the fuel consumption rate. In some forms, the actuation module may be contained within the vehicle dynamics module 112 shown in FIG. 3. Any vehicle system that varies an engine or transmission parameter may be referred to as an actuation module. In some forms, for example, the actuation module may vary the engine spark timing or the throttle, in order to control vehicle acceleration and/or axle torque.

The cost module 202 may be configured to determine the plurality of costs, with the following cost equation (10):

$$\text{Cost} = \Sigma (y(i|k) - y_{ref})^T Q_Y (y(i|k) - y_{ref}) + \quad (10)$$

$$(u(i|k) - u_{ref})^T Q_U (u(i|k) - u_{ref}) + \Delta u(i|k)^T Q_{\Delta u} \Delta u(i|k)$$

$$y = \begin{bmatrix} \text{Te\_a} \\ \text{FR\_a} \\ \text{Rat\_a} \\ \text{Ta\_a} \end{bmatrix}$$

$$y_{ref} = \begin{bmatrix} \text{Te\_r} \\ \text{FR\_r} \\ \text{Rat\_r} \\ \text{Ta\_r} - D \end{bmatrix}$$

$$u = \begin{bmatrix} \text{Te\_c} \\ \text{Rat\_c} \end{bmatrix}$$

$$u_{ref} = \begin{bmatrix} \text{Te\_r} \\ \text{Rat\_r} \end{bmatrix}$$

where Te_a=predicted actual engine output torque; FR_a=predicted actual fuel consumption rate; Rat_a=predicted actual transmission ratio; Ta_a=predicted actual axle torque; Te_r=engine output torque requested; FR_r=fuel consumption rate requested; Rat_r=transmission ratio requested; Ta_r=driver axle torque requested; Te_c=commanded engine output torque; Rat_c=commanded transmission ratio; $Q_y$=a first predetermined weighting value; $Q_u$=a second predetermined weighting value; $Q_{\Delta u}$=a third predetermined weighting value; i=index value; k=prediction step; and T=transposed vector. In this case, there are two values for the "u" variables, $u_1$ and $u_2$, such that i=1, 2, and there may be four values for the "y" variables, $y_1, y_2, y_3, y_4$, such that i=1, 2, 3, 4. As explained above, the $y_{ref}$ and $u_{ref}$ values may be determined by the steady state optimizer module 200, with the linearized axle torque requested value, Ta_r−D, being determined by subtracting the disturbance D from the axle torque requested Ta_r.

The plurality of costs may be determined even more particularly with the following equation (11), which is an MPC equation having a prediction horizon of three and a control horizon of two:

$$\text{Cost} = \{\lambda_a * (\text{Ta\_a}_k - \text{Ta\_r} - D)^2 + \quad (11)$$

$$\lambda_a * (\text{Ta\_a}_{k+1} - \text{Ta\_r} - D)^2 + \lambda_a * (\text{Ta\_a}_{k+2} - \text{Ta\_r} - D)^2\} +$$

$$\{\lambda_f * (\text{FR\_a}_k - \text{FR\_r})^2 + \lambda_f * (\text{FR\_a}_{k+1} - \text{FR\_r})^2 +$$

$$\lambda_f * (\text{FR\_a}_{k+2} - \text{FR\_r})^2\} +$$

$$\{\lambda_e * (\text{Te\_c}_k - \text{Te\_r})^2 + \lambda_e * (\text{Te\_c}_{k+1} - \text{Te\_r})^2\} +$$

$$\{\lambda_r * (\text{Rat\_c}_k - \text{Rat\_r})^2 + \lambda_r * (\text{Rat\_c}_{r+1} - \text{Rat\_r})^2\} +$$

$$\{\lambda_{\Delta r} * (\Delta \text{Rat\_c}_k)^2 + \lambda_{\Delta r} * (\Delta \text{Rat\_c}_{k+1})^2\} +$$

$$\{\lambda_{\Delta e} * (\Delta \text{Te\_c}_k)^2 + \lambda_{\Delta e} * (\Delta \text{Te\_c}_{k+1})^2\}$$

where $\lambda_a$=a first predetermined weighting value; Ta_$a_k$=predicted actual axle torque at a prediction step k; Ta_r=axle torque requested; D=estimated disturbance; Ta_$a_{k+1}$=predicted actual axle torque at a prediction step k+1; Ta_$a_{k+2}$=predicted actual axle torque at a prediction step k+2; $\lambda_f$=a second predetermined weighting value; FR_$a_k$=predicted actual fuel consumption rate at the prediction step k; FR_r=fuel consumption rate requested; FR_$a_{k+1}$=predicted actual fuel consumption rate at the prediction step k+1; FR_$a_{k+2}$=predicted actual fuel consumption rate at the prediction step k+2; $\lambda_e$=a third predetermined weighting value; Te_$c_k$=engine output torque commanded at the prediction step k; Te_r=engine output torque requested; Te_$x_{k+1}$=engine output torque commanded at the prediction step k+1; $\lambda_r$=a fourth predetermined weighting value; Rat_$c_k$=transmission ratio commanded at the prediction step k; Rat_r=transmission ratio requested; Rat_$c_{k+1}$=transmission ratio commanded at the prediction step k+1; $\lambda_{\Delta r}$=a fifth predetermined weighting value; $\Delta$Rat_$c_k$=change in transmission ratio commanded at the prediction step k; $\Delta$Rat_$c_{k+1}$=change in transmission ratio commanded at the prediction step k+1; $\lambda_{\Delta e}$=a sixth predetermined weighting value; $\Delta$Te_$c_k$=change in engine output torque commanded at the prediction step k; and $\Delta$Te_$c_{k+1}$=change in engine output torque commanded at the prediction step k+1. The prediction step k is the prediction at a current step, the prediction step k+1 is a prediction one step ahead, and the prediction step k+2 is a prediction two steps ahead. As explained above, the $y_{ref}$ and $u_{ref}$ values may be determined by the steady state optimizer module 200.

The cost equation (e.g., equation (10) or (11)) may be applied iteratively to arrive at the lowest cost for a plurality of sets of possible command values Te_c, Rat_c, where the plurality of sets of possible command values Te_c, Rat_c include the first and second sets of possible command values as well as a number of other possible sets of command values for Te_c, Rat_c. Then, the selection module 210 may select the set of possible command values Te_c, Rat_c of the plurality of command values having the lowest cost, where the set of possible command values Te_c, Rat_c having the lowest cost may be defined as the selected set, including the selected transmission ratio value Rat_c and the selected engine output torque value Te_c. Similarly, the cost module 208 may generate a surface representing the cost of possible sets of command values Te_c, Rat_c. The cost module 208 and/or the selection module 210 may then identify the possible set that has the lowest cost based on the slope of the cost surface.

The cost equation (e.g., equation (10) or (11)) may be subject to the following constraints 105, 107:

$Te_{min} \leq Te\_c_k \leq Te_{max}$;

$Te_{min} \leq Te\_c_{k+1} \leq Te_{max}$;

$Rat_{min} \leq Rat\_c_k \leq Rat_{max}$;

$Rat_{min} \leq Rat\_c_{k+1} \leq Rat_{max}$;

$\Delta Rat\_c_{min} \leq \Delta Rat\_c_k \leq \Delta Rat\_c_{max}$;

$\Delta Rat\_c_{min} \leq \Delta Rat\_c_{k+1} \leq \Delta Rat\_c_{max}$;

$$\Delta Te\_c_{min} \leq \Delta Te\_c_k \leq \Delta Te\_c_{max}; \text{ and}$$

$$\Delta Te\_c_{min} \leq \Delta Te\_c_{k+1} \leq \Delta Te\_c_{max},$$

where $Te_{min}$=a minimum possible engine output torque, $Te_{max}$=a maximum possible engine output torque, $Rat_{min}$=a minimum possible transmission ratio, $Rat_{max}$=a maximum possible transmission ratio, $\Delta Rat\_c_{min}$=a minimum possible rate of change in transmission ratio; $\Delta Rat\_c_{max}$=a maximum possible rate of change in transmission ratio, $\Delta Te\_c_{min}$=a minimum possible rate of change in engine output torque, and $\Delta Te\_c_{max}$=a maximum possible rate of change in engine output torque, where the constraints 105, 107 may be provided by the ECM 38 and the TCM 40, by way of example.

The constants, matrices, and gain referred to above, including A, B, C, $K_{KF}$, $Q_y$, $Q_u$, $Q_{\Delta u}$, $\lambda_a$, $\lambda_f$, $\lambda_e$, $\lambda_r$, $\lambda_{\Delta e}$, $\lambda_{\Delta r}$, are parameters of the system determined through testing, physical models, or other means. In some variations, a system identification procedure is run offline, for example, during a calibration, to identify the constants, matrices, and gain, and also to define $u_0$ and $y_0$. Once $u_0$ and $y_0$ are known, then $x_0$ can be computed from the prediction module equations (e.g., equations (5)-(7) or a subset thereof). Thereafter, each of the prediction module 204 and MPC module 202 equations (e.g., equations (5)-(7), (10), and (11) or a subset thereof) can be run to obtain initial values offline. Then, the control system 102 can be run online to constantly optimize the controlled parameters Te_c and Rat_c as the vehicle 9 is running through steady state and transient states. The constants allow the cost to be determined based on the relationship between and relative importance of each of the commanded values Te_c, Rat_c and tracked values (e.g., FR_m, Ta_m, Rat_m, Te_m). The relationships are weighted to control the effect that each relationship has on the cost.

In some forms, the MPC module 202 may generate the possible sets of command values Te_c, Rat_c by determining possible sequences, sets, or a surface containing the command values Te_c, Rat_c that could be used for N future control loops. The prediction module 204 may determine predicted responses to the possible sets of the command values Te_c, Rat_c using the prediction module equations (e.g., equations (15)-(17) or a subset thereof). For example, the prediction module 204 may determine a set of predicted actual axle torques Ta_a and a set of predicted actual fuel consumption rates FR_a for N control loops.

More particularly, a set of N values for each command value Te_c, Rat_c may be determined, and a set of M values for each predicted actual value Ta_a, FR_a may be determined based on the N command values Te_c, Rat_c. The cost module 208 may then determine the cost value for each of the possible sets of command values Te_c, Rat_c based on the predicted actual parameters Ta_a, FR_a (which may include $Ta\_a_k$, $Ta\_a_{k+1}$, $Ta\_a_{k+2}$, $FR\_a_k$, $FR\_a_{k+1}$, and $FR\_a_{k+2}$, depending on the particular cost equation (13), (14) used). The selection module 210 may then select one of the possible sets of the command values Te_c, Rat_c based on the costs of the possible sets, respectively. For example, the selection module 210 may select the possible set of command values Te_c, Rat_c having the lowest cost while satisfying the system constraints 105, 107 (e.g., $Te_{min}<Te\_c_k<Te_{max}$; $Te_{min}<Te\_c_{k+1}<Te_{max}$; $Rat_{min}<Rat\_c_k<Rat_{max}$; $Rat_{min}<Rat\_c_{k+1}<Rat_{max}$; $\Delta Te\_c_{min}<\Delta Te\_c_k<\Delta Te\_c_{max}$; $\Delta Te\_c_{min}<\Delta Te\_c_{k+1}<\Delta Te\_c_{max}$; $\Delta Rat\_c_{min}<\Delta Rat\_c_k<\Delta Rat\_c_{max}$; $\Delta Rat\_c_{min}<\Delta Rat\_c_{k+1}<\Delta Rat\_c_{max}$).

In some forms, satisfaction of the constraints 105, 107 may be considered in the cost determination. For example, the cost module 208 may determine the cost values further based on the constraints 105, 107, and the selection module 210 may select the possible set of command values Te_c, Rat_c that best achieves the axle torque request Ta while minimizing fuel consumption rate FR that has been determined to comply with the constraints 105, 107.

During steady-state operation, the command values Te_c, Rat_c may settle at or near the reference, or requested, values Te_r, Rat_r, respectively. During transient operation, however, the MPC module 202 may adjust the command values Te_c, Rat_c away from the reference values Te_r, Rat_r in order to best achieve the torque request Ta_r, while minimizing the fuel consumption rate FR and satisfying the constraints 105, 107.

In operation, the MPC module 202 may determine the cost values for the possible sets of controlled and predicted values (u, y). The MPC module 202 may then select the one of the possible sets having the lowest cost. The MPC module 202 may next determine whether the selected possible set satisfies the constraints 105, 107. If so, the possible set may be defined as the selected set. If not, the MPC module 202 determines the set with the lowest cost that satisfies the constraints 105, 107 and defines that set as the selected set. The selected Rat_c command value is output from the MPC module 202 to the plant 103 (see FIG. 4).

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The control system 100 may be configured to execute each of the steps of a method, as defined in the claims. Thus, the entire description with respect to FIGS. 1-5 may be applied by the control system 100 to effectuate the method, as claimed. Furthermore, the control system 100 may be or include a controller that includes a number of control logics that are configured to execute the steps of the method.

The controller(s) of the control system 100 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the many aspects of the present disclosure. While certain aspects have been described in detail, various alternative aspects exist for practicing the disclosure as defined in the appended claims.

What is claimed is:

1. A method for controlling a propulsion system of a motor vehicle, the method comprising:
    determining a plurality of requested values including a first requested value;
    determining a plurality of measured values including a first measured value, a second measured value, and a third measured value;
    determining an estimated disturbance based on a model of a relationship between the first and second measured values;
    subtracting the estimated disturbance from the first requested value to establish a linearized requested value;
    subtracting the estimated disturbance from the third measured value to establish a linearized measured value;
    determining a plurality of predicted values based in part on the plurality of measured values including the linearized measured value;
    generating a plurality of sets of possible command values;
    determining a cost for each set of possible command values of the plurality of sets of possible command values based on a first predetermined weighting value, a second predetermined weighting value, the plurality of predicted values, and the plurality of requested values including the linearized requested value;
    determining which set of possible command values of the plurality of sets of possible command values has a lowest cost;
    selecting the set of possible command values that has the lowest cost to define a set of selected command values; and
    controlling a vehicle parameter based on the selected command value.

2. The method of claim 1, wherein the first measured value is an engine parameter, and the second measured value is a transmission parameter.

3. The method of claim 1, wherein the first measured value is a measured engine output torque, the second measured value is a measured transmission ratio, the third measured value is a measured axle torque, and the first requested value is an axle torque requested.

4. The method of claim 3, wherein the estimated disturbance is determined with the following equation:

$$D = \left\{ \frac{(\text{Rat\_m}_k * 100 - \text{Rat}_{\mathit{off}})(\text{Te\_m}_k - \text{Te\_off})FD}{100} \right\} - \text{Loss}(\text{Rat\_m}_k, \text{RPM\_m}_k, \text{Te\_m}_k)$$

where D is the estimated disturbance, FD is a final drive ratio, $\text{Rat\_m}_k$ the measured transmission ratio at a prediction step k, Rat_off is a nominal offset set by ratio model linearization, $\text{Te\_m}_k$ is the measured engine output torque at the prediction step k, Te_off is a nominal offset set by engine torque model linearization, loss is a mechanical loss factor, and $\text{RPM\_m}_k$ is a measured engine speed at the prediction step k.

5. The method of claim 4, further comprising controlling a vehicle parameter based on at least one selected command value of the set of selected command values.

6. The method of claim 5, wherein the plurality of sets of possible command values includes a plurality of possible commanded engine output torque values and a plurality of possible commanded transmission ratio values and the set of selected command values includes a selected engine output torque value and a selected transmission ratio value, the method further comprising:
    generating a plurality of predicted actual axle torque values and a plurality of predicted actual fuel consumption rate values based on the plurality of sets of possible command values; and
    determining the cost for each set of possible command values further based on a predicted actual axle torque value of the plurality of predicted axle torque values and a predicted actual fuel consumption rate value of the plurality of predicted actual fuel consumption rate values.

7. The method of claim 6, further comprising determining the plurality of predicted actual axle torque values and the plurality of predicted actual fuel consumption rate values with the following set of equations:

$$x_{k+1} = \left\{ A * x_k + B * \begin{bmatrix} Te\_c \\ Rat\_c_k \end{bmatrix} + v \right\} + K_{KF} * \left( \begin{bmatrix} Te\_m_k \\ FR\_m_k \\ Rat\_m_k \\ Ta\_m_k - D \end{bmatrix} - \begin{bmatrix} Te\_a_k \\ FR\_a_k \\ Rat\_a_k \\ Ta\_a_k \end{bmatrix} \right)$$

$$\begin{bmatrix} Ta\_a_{k+1} \\ FR\_a_{k+1} \end{bmatrix} = C * x_{k+1} + w$$

where
$x_{k+1}$=state variable at a prediction step k+1;
$x_k$=state variable at a prediction step k;
A=a state matrix;
B=an input matrix;
Te_c=engine output torque commanded at the prediction step k;
$Rat\_c_k$=transmission ratio commanded at the prediction step k;
$K_{KF}$=Kalman filter gain;
$Te\_a_k$=predicted actual engine output torque at the prediction step k;
$FR\_a_k$=predicted actual fuel consumption rate at the prediction step k;
$Rat\_a_k$=predicted actual transmission ratio at the prediction step k;
$Ta\_a_k$=predicted actual axle torque at the prediction step k;
$Te\_m_k$=measured engine output torque at the prediction step k;
$FR\_m_k$=measured fuel consumption rate at the prediction step k;
$Rat\_m_k$=measured transmission ratio at the prediction step k;
$Ta\_m_k$=measured axle torque at the prediction step k;
D=estimated disturbance;
$Ta\_a_{k+1}$=predicted actual axle torque at the prediction step k+1;
$FR\_a_{k+1}$=predicted actual fuel consumption rate at the prediction step k+1;
C=an output matrix;
v=process noise; and
w=measurement noise.

8. The method of claim 7, further comprising determining the plurality of costs with the following cost equation:

$$\text{Cost} = \Sigma (y(i \mid k) - y_{ref})^T Q_Y (y(i \mid k) - y_{ref}) +$$
$$(u(i \mid k) - u_{ref})^T Q_U (u(i \mid k) - u_{ref}) + \Delta u(i \mid k)^T Q_{\Delta u} \Delta u(i \mid k)$$

$$y = \begin{bmatrix} Te\_a \\ FR\_a \\ Rat\_a \\ Ta\_a \end{bmatrix}$$

$$y_{ref} = \begin{bmatrix} Te\_r \\ FR\_r \\ Rat\_r \\ Ta\_r - D \end{bmatrix}$$

$$u = \begin{bmatrix} Te\_c \\ Rat\_c \end{bmatrix}$$

$$u_{ref} = \begin{bmatrix} Te\_r \\ Rat\_r \end{bmatrix}$$

where
Te_a=predicted actual engine output torque;
FR_a=predicted actual fuel consumption rate;
Rat_a=predicted actual transmission ratio;
Ta_a=predicted actual axle torque;
Te_r=engine output torque requested;
FR_r=fuel consumption rate requested;
Rat_r=transmission ratio requested;
Ta_r=axle torque requested;
D=estimated disturbance;
Te_c=commanded engine output torque;
Rat_c=commanded transmission ratio;
$Q_y$=the first predetermined weighting value;
$Q_u$=the second predetermined weighting value;
$Q_{\Delta u}$=a third predetermined weighting value;
i=index value;
k=prediction step; and
T=transposed vector.

9. A control system for a propulsion system of a motor vehicle having a transmission and an engine, the control system comprising:
a reference generator configured to generate a plurality of requested values including a first requested value;
a linearization module configured to generate an estimated disturbance based on a model of a relationship between first and second measured values, the control system being configured to subtract the estimated disturbance from the first requested value to establish a linearized requested value, and the control system being configured to subtract the disturbance from a third measured value to establish a linearized measured value;
a prediction module configured to generate a plurality of predicted values based in part on the first measured value, the second measured value, and the linearized measured value;
a command generator module configured to generate a plurality of sets of possible command values;
a cost module configured to:
 determine a cost for each set of possible command values of the plurality of sets of possible command values based on a first predetermined weighting value, a second predetermined weighting value, the plurality of predicted values, and the plurality of requested values including the linearized requested value; and
 determine which set of possible command values of the plurality of sets of possible command values has a lowest cost;
a selection module configured to select the set of possible command values that has the lowest cost to define a set of selected command values; and
an actuation module configured to control a vehicle parameter based on the selected command value.

10. The control system of claim 9, wherein the first measured value is an engine parameter, and the second measured value is a transmission parameter.

11. The control system of claim 9, wherein the first measured value is a measured engine output torque, the second measured value is a measured transmission ratio, the third measured value is a measured axle torque, and the first requested value is an axle torque requested.

12. The control system of claim 11, wherein the linearization module is configured to generate the estimated disturbance with the following equation:

$$D = \left\{ \frac{(\text{Rat\_m}_k * 100 - \text{Rat}_{off})(\text{Te\_m}_k - \text{Te\_off})FD}{100} \right\} - \text{Loss}(\text{Rat\_m}_k, \text{RPM\_m}_k, \text{Te\_m}_k)$$

where D is the estimated disturbance, FD is a final drive ratio, $\text{Rat\_m}_k$ the measured transmission ratio at a prediction step k, $\text{Rat\_off}$ is a nominal offset set by ratio model linearization, $\text{Te\_m}_k$ is the measured engine output torque at the prediction step k, Te_off is a nominal offset set by engine torque model linearization, loss is a mechanical loss factor, and $\text{RPM\_m}_k$ is a measured engine speed at the prediction step k.

13. The control system of claim 12, further comprising an actuation module configured to control a vehicle parameter based on at least one selected command value of the set of selected command values.

14. The control system of claim 13, wherein the set of selected command values includes a selected engine output torque value and a selected transmission ratio value, the plurality of predicted values including a plurality of predicted actual axle torque values and a plurality of predicted actual fuel consumption rate values, the prediction module being configured to generate the plurality of predicted values based on the plurality of sets of possible command values, the plurality of sets of possible command values including a plurality of possible commanded transmission ratio values and a plurality of possible commanded engine torque values, wherein the cost module is configured to determine the cost for each set of possible command values further based on a predicted actual axle torque value of the plurality of predicted axle torque values and a predicted actual fuel consumption rate value of the plurality of predicted actual fuel consumption rate values, the plurality of requested values including a fuel consumption rate requested value, the linearized requested value, an engine output torque requested value, and a transmission ratio requested value.

15. The control system of claim 14, wherein the prediction module is configured to generate the plurality of predicted actual axle torque values and the plurality of predicted actual fuel consumption rate values with the following set of equations:

$$x_{k+1} = \left\{ A * x_k + B * \begin{bmatrix} \text{Te\_c} \\ \text{Rat\_c}_k \end{bmatrix} + v \right\} + K_{KF} * \left( \begin{bmatrix} \text{Te\_m}_k \\ \text{FR\_m}_k \\ \text{Rat\_m}_k \\ \text{Ta\_m}_k - D \end{bmatrix} - \begin{bmatrix} \text{Te\_a}_k \\ \text{FR\_a}_k \\ \text{Rat\_a}_k \\ \text{Ta\_a}_k \end{bmatrix} \right)$$

$$\begin{bmatrix} \text{Ta\_a}_{k+1} \\ \text{FR\_a}_{k+1} \end{bmatrix} = C * x_{k+1} + w$$

where
$x_{k+1}$=state variable at a prediction step k+1;
$x_k$=state variable at a prediction step k;
A=a state matrix;
B=an input matrix;
Te_c=engine output torque commanded at the prediction step k;
$\text{Rat\_c}_k$=transmission ratio commanded at the prediction step k;
$K_{KF}$=a Kalman filter gain;
$\text{Te\_a}_k$=predicted actual engine output torque at the prediction step k;
$\text{FR\_a}_k$=predicted actual fuel consumption rate at the prediction step k;
$\text{Rat\_a}_k$=predicted actual transmission ratio at the prediction step k;
$\text{Ta\_a}_k$=predicted actual axle torque at the prediction step k;
$\text{Te\_m}_k$=measured engine output torque at the prediction step k;
$\text{FR\_m}_k$=measured fuel consumption rate at the prediction step k;
$\text{Rat\_m}_k$=measured transmission ratio at the prediction step k;
$\text{Ta\_m}_k$=measured axle torque at the prediction step k;
D=estimated disturbance;
$\text{Ta\_a}_{k+1}$=predicted actual axle torque at the prediction step k+1;
$\text{FR\_a}_{k+1}$=predicted actual fuel consumption rate at the prediction step k+1;
C=an output matrix;
v=process noise; and
w=measurement noise.

16. The control system of claim 15, wherein the cost module is configured to determine the plurality of costs with the following cost equation:

$$\text{Cost} = \Sigma(y(i|k) - y_{ref})^T Q_Y (y(i|k) - y_{ref}) + (u(i|k) - u_{ref})^T Q_U (u(i|k) - u_{ref}) + \Delta u(i|k)^T Q_{\Delta u} \Delta u(i|k)$$

$$y = \begin{bmatrix} \text{Te\_a} \\ \text{FR\_a} \\ \text{Rat\_a} \\ \text{Ta\_a} \end{bmatrix}$$

$$y_{ref} = \begin{bmatrix} \text{Te\_r} \\ \text{FR\_r} \\ \text{Rat\_r} \\ \text{Ta\_r} - D \end{bmatrix}$$

$$u = \begin{bmatrix} \text{Te\_c} \\ \text{Rat\_c} \end{bmatrix}$$

$$u_{ref} = \begin{bmatrix} \text{Te\_r} \\ \text{Rat\_r} \end{bmatrix}$$

where
Te_a=predicted actual engine output torque;
FR_a=predicted actual fuel consumption rate;
Rat_a=predicted actual transmission ratio;
Ta_a=predicted actual axle torque;
Te_r=engine output torque requested;
FR_r=fuel consumption rate requested;
Rat_r=transmission ratio requested;
Ta_r=axle torque requested;
D=estimated disturbance;

Te_c=commanded engine output torque;
Rat_c=commanded transmission ratio;
$Q_y$=the first predetermined weighting value;
$Q_u$=the second predetermined weighting value;
$Q_{\Delta u}$=a third predetermined weighting value;
i=index value;
k=prediction step; and
T=transposed vector.

17. The control system of claim 16, further comprising a steady state optimizer module configured to:
   determine an accelerator pedal position;
   determine an estimated engine speed;
   determine a vehicle speed;
   determine an air-fuel ratio;
   generate the first requested value, the first requested value being an axle torque requested value, based on the accelerator pedal position and the vehicle speed;
   generate a transmission ratio requested value based on the axle torque requested value and the vehicle speed;
   generate an engine output torque requested value based on the axle torque requested value, the transmission ratio requested value, and a final drive ratio; and
   generate a fuel rate requested value.

18. A propulsion system for a motor vehicle, comprising:
   an engine operable to power the motor vehicle, the engine having an engine output shaft configured to transfer engine output torque;
   a continuously variable transmission having a variator assembly including a first pulley and a second pulley, the first and second pulleys being rotatably coupled by a rotatable member, at least one of the first and second pulleys including a movable sheave translatable along an axis to selectively change a transmission ratio between the engine output shaft and a transmission output shaft;
   a drive axle configured to be driven via the transmission output shaft, the drive axle being configured to output axle torque to a set of wheels; and
   a control system comprising:
      a reference generator module configured to generate a plurality of requested values including an axle torque requested value;
      a linearization module configured to generate an estimated disturbance based on a model of a relationship between a measured engine output torque value and a measure transmission ratio value, the control system being configured to subtract the estimated disturbance from the axle torque requested value to establish a linearized axle torque requested value, and the control system being configured to subtract the estimated disturbance from a measured axle torque value to establish a linearized axle torque measured value;
      a command generator module configured to generate a plurality of sets of possible command values;
      a prediction module configured to generate a plurality of predicted actual axle torque values and a plurality of predicted actual fuel consumption rate values based on the plurality of sets of possible command values, the measured engine output torque value, the measured transmission ratio value, and the linearized axle torque measured value, the plurality of sets of possible command values including a plurality of possible commanded transmission ratio values and a plurality of possible commanded engine output torque values;
      a cost module configured to:
         determine a cost for each set of possible command values of the plurality of sets of possible command values based on a first predetermined weighting value, a second predetermined weighting value, the plurality of predicted values, and the plurality of requested values including the linearized axle torque requested value; and
         determine which set of possible command values of the plurality of sets of possible command values has a lowest cost;
      a selection module configured to select the set of possible command values that has the lowest cost to define a set of selected command values;
      and an actuation module configured to control a vehicle parameter based on at least one selected command value of the set of selected command values.

19. The propulsion system of claim 18, wherein the linearization module is configured to generate the estimated disturbance with the following equation:

$$D = \left\{ \frac{(\text{Rat\_m}_k * 100 - \text{Rat}_{off})(\text{Te\_m}_k - \text{Te\_off})FD}{100} \right\} - \text{Loss}(\text{Rat\_m}_k, \text{RPM\_m}_k, \text{Te\_m}_k)$$

where D is the estimated disturbance, FD is a final drive ratio, $\text{Rat\_m}_k$ the measured transmission ratio at a prediction step k, Rat_off is a nominal offset set by ratio model linearization, $\text{Te\_m}_k$ is the measured engine output torque at the prediction step k, Te_off is a nominal offset set by engine torque model linearization, loss is a mechanical loss factor, and $\text{RPM\_m}_k$ is a measured engine speed at the prediction step k, and wherein the prediction module is configured to determine the plurality of predicted actual axle torque values and the plurality of predicted actual fuel consumption rate values with the following set of equations:

$$x_{k+1} = \left\{ A * x_k + B * \begin{bmatrix} \text{Te\_c} \\ \text{Rat\_c}_k \end{bmatrix} + v \right\} + K_{KF} * \left( \begin{bmatrix} \text{Te\_m}_k \\ \text{FR\_m}_k \\ \text{Rat\_m}_k \\ \text{Ta\_m}_k - D \end{bmatrix} - \begin{bmatrix} \text{Te\_a}_k \\ \text{FR\_a}_k \\ \text{Rat\_a}_k \\ \text{Ta\_a}_k \end{bmatrix} \right)$$

$$\begin{bmatrix} \text{Ta\_a}_{k+1} \\ \text{FR\_a}_{k+1} \end{bmatrix} = C * x_{k+1} + w$$

where
$x_{k+1}$=state variable at a prediction step k+1;
$x_k$=state variable at a prediction step k;
A=a state matrix;
B=an input matrix;
Te_c=engine output torque commanded at the prediction step k;
$\text{Rat\_c}_k$=transmission ratio commanded at the prediction step k;
$K_{KF}$=a Kalman filter gain;
$\text{Te\_a}_k$=predicted actual engine output torque at the prediction step k;
$\text{FR\_a}_k$=predicted actual fuel consumption rate at the prediction step k;
$\text{Rat\_a}_k$=predicted actual transmission ratio at the prediction step k;
$\text{Ta\_a}_k$=predicted actual axle torque at the prediction step k;

Te_$m_k$=measured engine output torque at the prediction step k;
FR_$m_k$=measured fuel consumption rate at the prediction step k;
Rat_$m_k$=measured transmission ratio at the prediction step k;
Ta_$m_k$=measured axle torque at the prediction step k;
D=estimated disturbance;
Ta_$a_{k+1}$=predicted actual axle torque at the prediction step k+1;
FR_$a_{k+1}$=predicted actual fuel consumption rate at the prediction step k+1;
C=an output matrix;
v=process noise; and
w=measurement noise.

* * * * *